United States Patent [19]

Rogers

[11] 4,011,539
[45] Mar. 8, 1977

[54] SEISMIC DETECTOR ARRAYS
[75] Inventor: John R. Rogers, Stafford, Tex.
[73] Assignee: Texaco Inc., New York, N.Y.
[22] Filed: Dec. 22, 1975
[21] Appl. No.: 643,420
[52] U.S. Cl. .................. 340/7 R; 340/15.5 MC; 340/9
[51] Int. Cl.² .......................................... G01V 1/20
[58] Field of Search ... 340/7 R, 15.5 MC, 15.5 CP, 340/9

[56] References Cited
UNITED STATES PATENTS

| | | | |
|---|---|---|---|
| 2,232,613 | 2/1941 | Klipsch | 340/15.5 CP |
| 2,906,363 | 9/1959 | Clay, Jr. | 340/15.5 MC |
| 3,096,846 | 7/1963 | Savit et al. | 340/15.5 MC |
| 3,335,401 | 8/1967 | Kerns | 340/7 R |
| 3,400,783 | 9/1968 | Lee et al. | 340/15.5 MC |
| 3,780,372 | 12/1973 | Unz | 343/844 |
| 3,852,708 | 12/1974 | Doolittle et al. | 340/7 R |
| 3,877,033 | 4/1975 | Unz | 340/9 |

OTHER PUBLICATIONS

"Electroacoustic Characteristics of Marine Seismic Streamers", Bedenbender et al., *Geophysics*, vol. 35, No. 6, Dec. 1970, p. 1054–1072.

Primary Examiner—Howard A. Birmiel
Attorney, Agent, or Firm—Carl G. Ries; Thomas H. Whaley; William J. Beard

[57] ABSTRACT

A new and improved seismic survey cable, and method of seismic exploration with such a cable is disclosed. The system has detectors or hydrophones spaced in the cable so as to achieve a detector density conforming to a Gaussian frequency distribution within a specified frequency band to reduce noise in the survey data.

18 Claims, 8 Drawing Figures

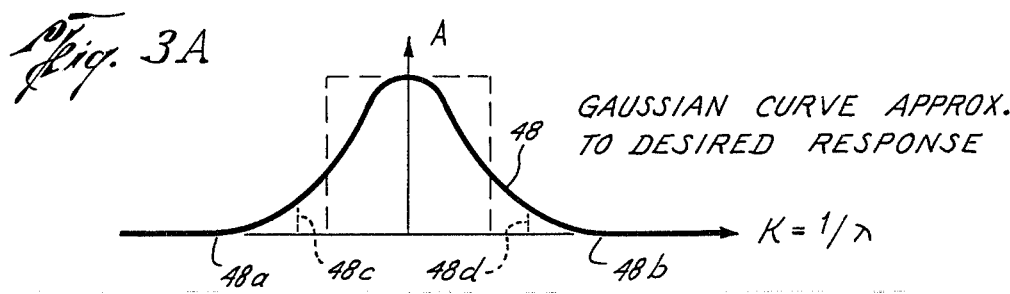
Fig. 3A  GAUSSIAN CURVE APPROX. TO DESIRED RESPONSE
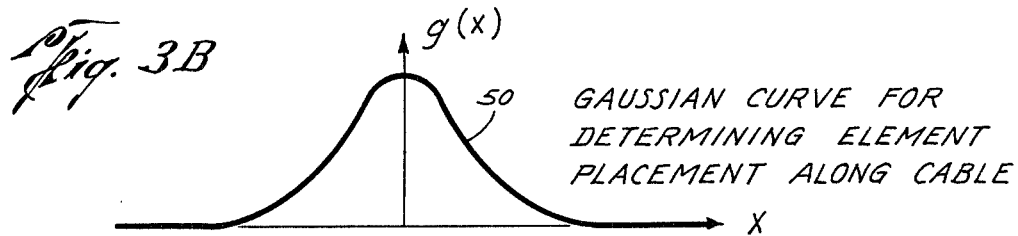
Fig. 3B  GAUSSIAN CURVE FOR DETERMINING ELEMENT PLACEMENT ALONG CABLE
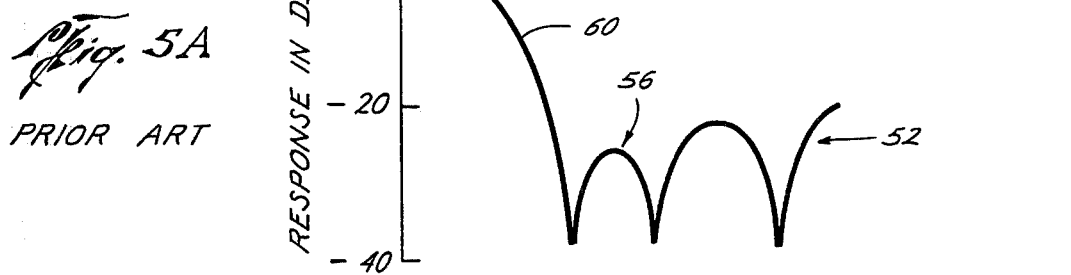
Fig. 5A  PRIOR ART
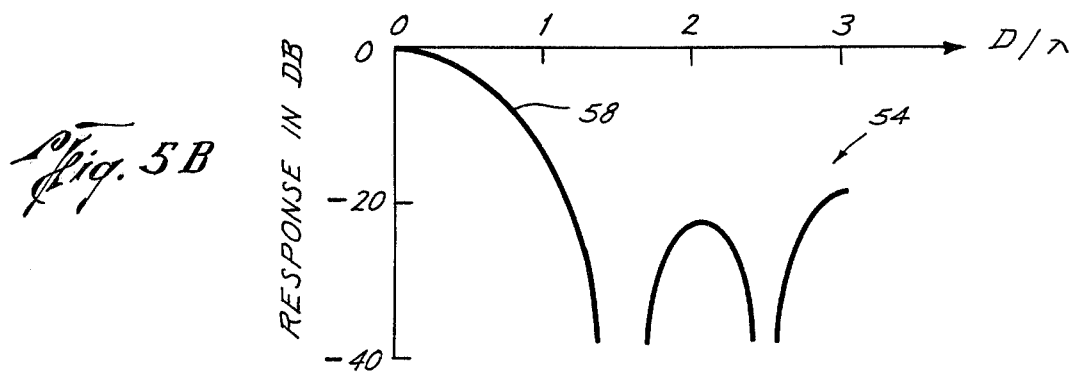
Fig. 5B

SEISMIC DETECTOR ARRAYS

BACKGROUND OF THE INVENTION

The present invention relates to seismic detector arrays for use in seismic surveying.

In seismic surveying, efforts have been directed towards increasing signals of interest and reducing undesirable signals of interest and reducing undesirable extraneous signals or noise. In marine seismic surveying, one particularly troublesome source of noise has been boat noise, which typically includes acoustic vibrations transmitted into the water from the propellers of the boat towing the marine seismic cable, acoustic noise from the flow of water past the moving boat and acoustic noise from equipment on the boat transmitted into the water through the boat hull.

Attempts have been made to specify spacing of individual detectors with respect to each other in the detector groups so that all frequencies within a desired frequency pass band are sensed in a manner so as to be included, while frequencies outside the pass band are not included. However, the detector spacing necessary to achieve such an all or nothing frequency response was not physically achievable, so that desirable signal power was excluded from recorded survey data and unnecessary amounts of undesirable noise were sensed by the detectors.

SUMMARY OF THE INVENTION

Briefly, the present invention provides a seismic survey cable apparatus for seismic surveying with reduced noise in the survey data, and a new and improved method of seismic surveying with the cable.

An array of a plurality of detectors is formed along the length of the cable, and each of the detectors are located within the array at a position to achieve a detector density conforming to a Gaussian frequency distribution within a frequency band of desired signals in the survey data to thereby exclude and reduce noise in the survey data. Preferably, the cable is formed from a plurality of detector groups spaced along the length of the cable, each detector group having therein a plurality of hydrophones or detectors spaced at positions to achieve the detector density conforming to a Gaussian frequency distribution.

In the seismic exploration method of the present invention, the cable apparatus is towed behind a marine seismic vessel. Seismic energy waves are emitted into the body of water and submerged formations. The energy reflected from the submerged formations is sensed with the detectors in the cable, and the sensed responses of the detectors in the cable spaced according to the present invention are summed to reduce noise in the survey data.

With detectors spaced in the cable to achieve a Gaussian frequency distribution according to the present invention, the frequency pass band may be truncated at a desired frequency limit according to a specified degree of noise suppression or an array response level requirement. Further, the truncation limits of the Gaussian frequency distribution may be extended beyond those physically realizable with prior art systems, permitting larger amounts of useful signal information to be retained.

BRIEF DESCRIPTION OF THE DRAWINGS

FIG. 3A is a plot of a Gaussian frequency pass band for a seismic cable according to the present invention;

FIG. 3B is a plot of detector density, $g(x)$, as a function of detector spacing to obtain the Gaussian frequency pass band of FIG. 3A;

FIG. 5A is an example plot of a cable response using prior art detector spacing according to FIGS. 2A and 2B; and FIG. 5B is an example plot of a cable response for detector spacing according to the present invention.

DESCRIPTION OF THE PREFERRED EMBODIMENT

Figure 1:
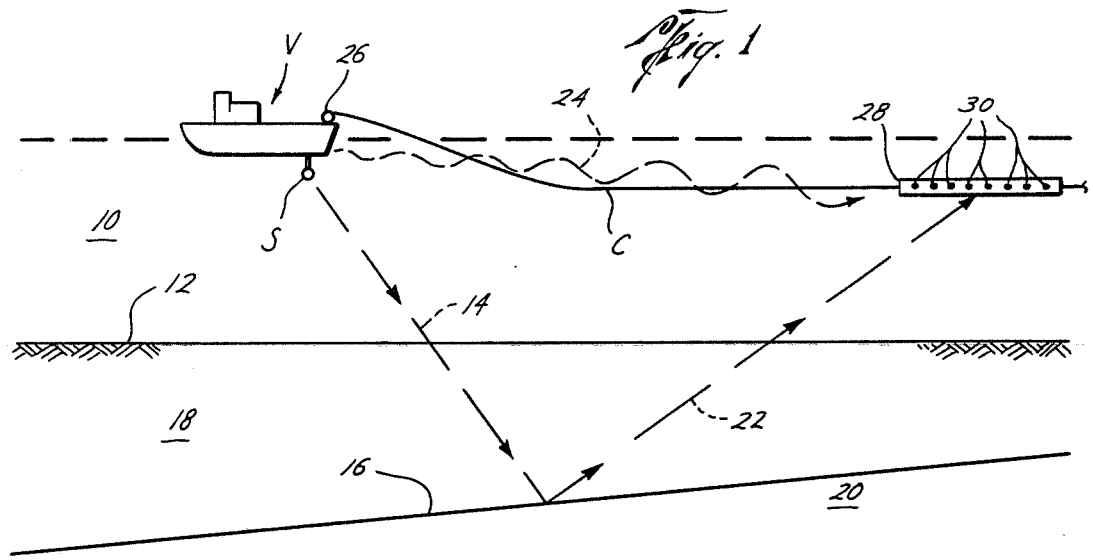
FIG. 1 is an elevation view, partly in cross-section, of a seismic vessel and cable performing a seismic survey according to the present invention.

In the drawings, a seismic exploration vessel V is shown (FIG. 1) towing a marine seismic cable C through a body of water 10. A seismic source S with the vessel V emits seismic or acoustic energy waves which travel through the body of water 10 and a floor 12 of the body of water. As will be understood by those in the art, portions of the energy of the seismic waves from the source S travelling downwardly as indicated by a dashed line 14, are reflected by interfaces or horizons between submerged formations, such as a seismic horizon 16 between formations 18 and 20. It should be understood that usually several horizons are present. The reflections from the submerged horizons travel upwardly as indicated by a line 28 and are sensed by hydrophones, also known as seismic sensors or detectors, in the cable C.

As the vessel V travels through the water, boat noise indicated by a line 24 travels rearwardly from the vessel V and is sensed along with the desired seismic reflections from submerged formations by the detectors in the cable C. Typical sources of boat noise include acoustic vibrations transmitted into the water from the propellers of the vessel V, noise from the flow of water passing the moving vessel V and noise from vessel equipment which is transmitted into the water through the hull of the vessel V.

The marine seismic cable C is stored on a reel or winch 26 and is deployed therefrom behind the vessel V during seismic explorations. In the cable C, the detectors are arranged into a suitable number of detector groups along the length of the cable C, one of which is schematically indicated at 28. A typical number of detector groups is 24 or 48, although it should be understood that other numbers of detector groups in addition to the foregoing numbers may be used as well. A typical detector group in the cable C contains from six to 40 individual hydrophones or detectors, electrically connected together in parallel and schematically indicated at 30. The responses from the hydrophones within each detector group are summed and recorded by conventional seismic signal storage and processing equipment on the vessel V, as will be understood by those in the art.

Each detector group 28 in the cable C thus functions as one common detector having an enhanced signal response characteristic due to the summation of the response of numerous detectors 30, with the effective location of such detector being at the mid-point of the detector group. The responses of each detector group along the cable C are then processed and analyzed in order to determine the likelihood of existence of hydrocarbon reserves in the submerged formations.

Figure 2A:
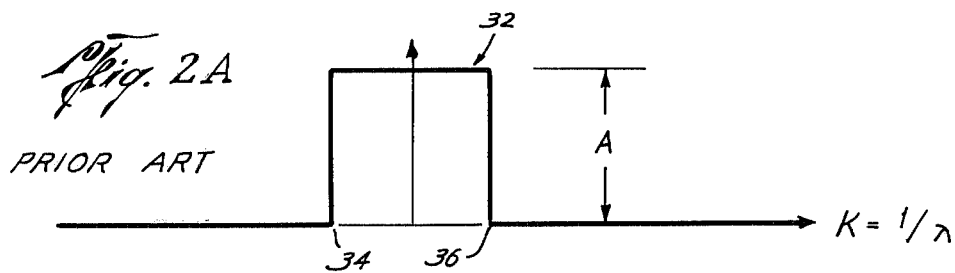
FIG. 2A is a plot of an ideal frequency pass band attempted by the prior art for a seismic cable.
Figure 2B:
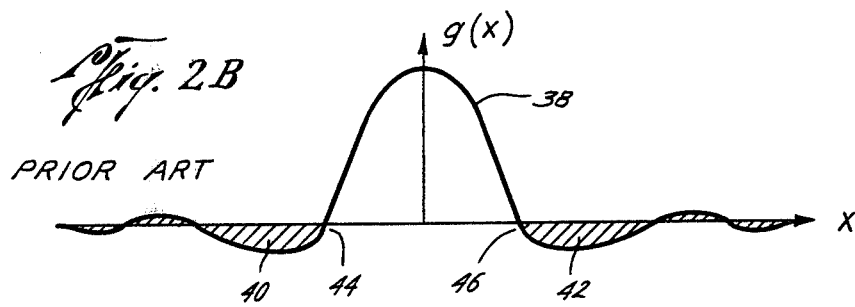
FIG. 2B is a plot of detector density, $g(x)$, as a function of detector spacing $x$ to obtain the frequency pass band of FIG. 2A.

Referring now to FIGS. 2A and 2B, in the prior art, attempts were made to have the seismic detector cable C simulate a seismic filter having a frequency pass band defined by a performance characteristic curve 32 with a constant gain A, typically unity, over a desired frequency pass band or range from points 34 to 36 on a frequency scale K, $K=1/\lambda$, where $\lambda$ is the wavelength of seismic energy. With such a frequency pass band, all frequencies within the desired band would be sensed with constant gain, while all frequencies outside the pass band would be muted.

A detector density curve 38 in the form of a sine cardinal element function, $g/x = $ sine $x/x$, defines the densities of detectors within a detector group in a seismic cable C according to the prior art frequency pass band 32 as a function of distance $x$ from the detector group mid-point. The density curve 38 also represents the Fourier transformation from the frequency domain to the distance or time domain of the desired frequency response curve 32. However, as is evident from inspection of the curve 28, portions 40 and 42 thereof specify a negative detector density along portions of the detector group, which negative density cannot be physically achieved.

Accordingly, the detector density curve 28 was frequently truncated at points 44 and 46 to overcome this problem, forming a truncated since cardinal function. As is evident from those shaded portions of the curve 28 outside the truncation limits, with truncation of the sine cardinal function, a significant amount of the useful seismic signal energy, typically on the order of 15%, was not sensed in the cable C and available for subsequent processing and analysis.

With the present invention, however, it has been found that by using a Gaussian distribution curve 48 (FIG. 3A) as the desired frequency response, significantly increased amounts of signal energy may be recorded. Further, with the Gaussian distribution curve 48, significant amounts of boat noise may be removed from the survey data. The Gaussian frequency response 48 of the cable C is of the general form:

$$A = e^{-i\kappa t/\lambda)^2}$$

where $\lambda$ is the wavelength of acoustic or seismic energy and $b$ is a design constant.

Further, when the Gaussian curve 48 is the desired frequency response, a cable density curve 50 in the form of a Gaussian curve is formed, representing the Fourier transformation of the curve 48 and generally of the form:

$$g(x) = e^{-cx^2}$$

where $c$ is a design constant.

It is to be noted that with the Gaussian density function in the form of the curve 50, all values of $g(x)$ are positive, so that the density function is physically achievable for distances $x$ of interest. Further, the Gaussian frequency response curve 48 may be specified so that frequency limits 48a and 48b can be defined so that low frequencies typically present in reflection seismic surveys are emphasized, while high frequencies such as boat noise are cancelled, while accepting more frequencies of interest than those permitted with the prior art (FIG. 2A). Additionally, where such extreme accuracy is not required, the Gaussian frequency response curve 48 may be truncated at desired frequency limits less than 48a and 48b, as indicated by phantom lines 48c and 48d, yet accepting frequency bands greater than that of the prior art, with attenuation of undesired higher frequency.

Figure 4:
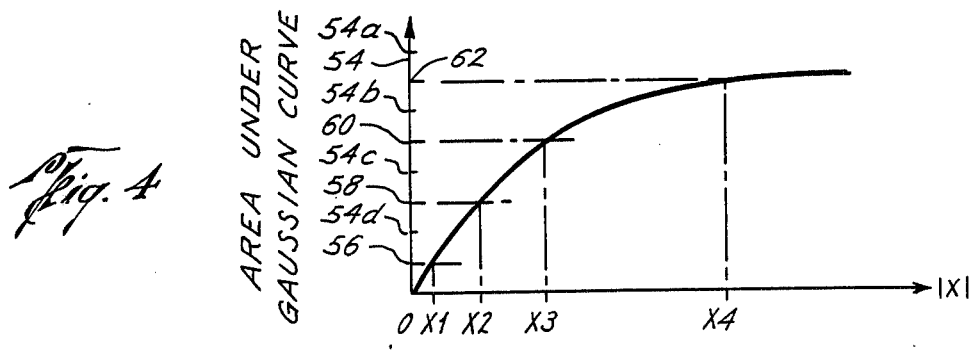
FIG. 4 is an example chart used in locating detectors in a cable according to the present invention.

A curve 52 (FIG. 4), indicating the area under the density curve 50 as a function of distance $x$ from the mid-point of the detector group, is used to determine actual detector spacing required to achieve a Gaussian density function according to the present invention.

To determine the locations of individual detectors in a detector group in order to achieve the Gaussian density function and thus the Gaussian frequency response, the ordinate (area) axis 54 of the plot of curve 52 is divided into a number of equal increments as indicated by the increments between points 54a, 54b, 54c and 54d on the axis 54. The number of increments corresponds to the number of detectors to be located in each half of the detector group from the detector group mid-point $x=0$. The $y$-intercept on the axis 54 for the mid-point of each of the increments is then determined and marked on the axis 50, as indicated by points 56, 58, 60 and 62. The $y$-intercept of the curve 52 for each such increment mid-point $y$-intercept on the axis 50 is then determined by marking the horizontal intercept from such mid-point $y$-intercepts on the curve 42, as indicated by the horizontal lines in FIG. 4.

The $x$-spacing, X1, X2, X3 and X4 of each detector is then determined by measuring the $x$-coordinate of each of the $y$-intercepts on the curve 42, thereby specifying the distance $x$ from the detector group mid-point at which each such detector should be located in the detector group.

In performing a seismic survey, the cable C, having detectors spaced in detector groups therein according to the present invention, is deployed and towed behind the vessel V. Seismic energy waves emitted by the source S then travel through the body of water 10 and formations submerged therebeneath. Seismic energy reflected from the submerged horizons travels upwardly through the body of water while boat noise travels rearwardly through the body of water from the vessel V. However, with detectors spaced in the cable C according to the present invention, boat noise sensed by the detectors is substantially eliminated upon recording and summation, since each detector group in the cable C is effectively transformed into a seismic filter having the desired frequency response of FIG. 3A.

A comparison of a curve 52 (FIG. 5A) setting forth an example response of a seismic cable having detector spacing therein according to the prior art techniques, (FIG. 2A and 2B) and a curve 54 setting forth an example response of a seismic cable having detector spacing according to the present invention illustrates the enhanced performance results and advantages of detector spacing according to the present invention. It is to be noted that a noise or side lobe 56 in the curve 52 at a frequency to wavelength, $d/\lambda$, ratio corresponding to the approximate frequencies of boat noise, 100 to 150 hertz, is no longer present at significant noise levels in the performance curve 54 for a cable having detector spacing according to the present invention. Further, a primary lobe 58 of the curve 54 extends to a greater frequency than a lobe 60 of the curve 52, indicating increased sensing and response of meaningful seismic energy which is not so sensed with the prior truncated sine cardinal function spacing.

The foregoing disclosure and description of the invention are illustrative and explanatory thereof, and various changes in the size, shape and materials, as well as in the details of the illustrated construction may be made without departing from the spirit of the invention.

I claim:

1. Seismic survey cable apparatus for producing seismic survey data with reduced noise, comprising:
   a detector array of a plurality of seismic detectors distributed along the length of a cable, the detectors being located within said array at positions to achieve a detector density conforming to a Gaussian frequency distribution within a frequency band of desired signals to thereby reduce noise in the survey data.

2. The apparatus of claim 1, wherein:
   a. said detectors in said array comprise a plurality of detector groups, each containing a plurality of detectors connected in common; and
   b. said detectors in selected ones of said plurality of detector groups being located within said detector group to achieve a detector density conforming to said Gaussian frequency distribution.

3. The apparatus of claim 1, wherein:
   a. said detectors in said array comprise a plurality of detector groups, each containing a plurality of detectors connected in common; and
   b. said detectors in each of said plurality of detector groups being located within said detector group to achieve a detector density conforming to said Gaussian frequency distribution.

4. A method of marine seismic surveying of formations submerged beneath a body of water with reduced noise in the survey data, comprising the steps of:
   a. towing a seismic cable having an array of seismic detectors therein, said seismic detectors being located within said array at a position to achieve a detector density conforming to a Gaussian frequency distribution within a frequency band of desired signals in the survey data to thereby reduce noise in the survey data, behind a marine exploration vessel;
   b. emitting seismic energy waves into the body of water and submerged formations;
   c. sensing the response of the submerged formations with an array of detectors spaced at said detector density conforming to said Gaussian frequency distribution; and
   d. summing the sensed responses, whereby noise in the survey data is reduced.

5. The method of claim 4, wherein detectors are located in the seismic cable by performing the steps of:
   a. assigning a Gaussian frequency distribution as the desired frequency response of the array within a frequency band excluding noise frequencies; and
   b. locating detectors at positions within the array to achieve a density of detectors along the length of the array conforming to the assigned Gaussian frequency distribution.

6. The method of claim 5, wherein said step of assigning comprises:
   assigning a truncated Gaussian frequency distribution with frequency limits according to a limited frequency band to exclude noise frequencies as the desired frequency response of the array.

7. A method of claim 5, wherein said step of locating comprises the steps of:
   a. forming a density function defining the density of detectors as a function of length along the array;
   b. forming from the density function an indication of the requisite spacing of detectors for achieving such density function; and
   c. locating detectors in the array at positions conforming to the requisite spacing.

8. The method of claim 5, wherein said step of forming a density function comprises the step of:
   forming a density function in the form of a Fourier transform of the Gaussian frequency distribution desired frequency response.

9. The method of claim 5, wherein said step of forming an indication of the requisite spacing of detectors comprises the steps of:
   a. forming an indication of the area within said density function as a function of length along the array; and
   b. allocating the indication of area within said density function into a number of segments equal to the number of detectors in the array.

10. The method of claim 9, wherein said step of locating detectors comprises:
    locating detectors at a position in the array corresponding to the location along the length of the array of one of the equal area segments.

11. The method of claim 4, wherein said detectors in said towed array comprise:
    a plurality of detector groups, each containing a plurality of detectors connected in common, said detectors in selected ones of said plurality of detector groups being located within said detector group to achieve a detector density conforming to said Gaussian frequency distribution.

12. The method of claim 4, wherein said detectors in said towed array comprise:
    a plurality of detector groups, each containing a plurality of detectors connected in common, said detectors in each of said plurality of detector groups being located within said detector group to achieve a detector density conforming to said Gaussian frequency distribution.

13. The method of claim 12, wherein the detectors are located in each of said plurality of detector groups by performing the steps of:
    a. assigning a Gaussian frequency distribution as the desired frequency response within a frequency band excluding noise frequencies; and
    b. locating detectors for each detector group at positions within a detector group to achieve a density of detectors along the length of a detector group conforming to the assigned Gaussian frequency distribution.

14. The method of claim 13, wherein said step of assigning comprises:
    assigning a truncated Gaussian frequency distribution with frequency limits according to a limited frequency band to exclude noise frequencies as the desired frequency response of the array.

15. The method of claim 13, wherein said step of locating comprises the steps of:
 a. forming a density function defining the density of detectors as a function of length along each detector group;
 b. forming from the density function an indication of the requisite spacing of detectors for achieving such density function; and
 c. locating detectors in each detector group at positions conforming to the requisite spacing.

16. The method of claim 13, wherein said step of forming a density function comprises the step of:
 forming a density function in the form of a Fourier transform of the Gaussian frequency distribution desired frequency response.

17. The method of claim 13, wherein said step of forming an indication of the requisite spacing of detectors comprises the steps of:
 a. forming an indication of the area within said density function as a function of length along each detector group; and
 b. allocating the indication of area within said density function into a number of segments equal to the number of detectors in each detector group.

18. The method of claim 17, wherein said step of locating detectors comprises:
 locating detectors at a position in each detector group corresponding to the location along the length of each detector group of one of the equal area segments.

* * * * *